(12) United States Patent
Callahan et al.

(10) Patent No.: US 11,002,171 B2
(45) Date of Patent: May 11, 2021

(54) EXHAUST HEAT RECOVERY AND ACOUSTIC VALVE WITH EXHAUST GAS RECIRCULATION FEATURES

(71) Applicant: Faurecia Emissions Control Technologies, USA, LLC, Columbus, IN (US)

(72) Inventors: Joseph Callahan, Greenwood, IN (US); Hans-Christoph Hossfeld, Westendorf (DE)

(73) Assignee: Faurecia Emissions Control Technologies, USA, LLC, Columbus, IN (US)

( * ) Notice: Subject to any disclaimer, the term of this patent is extended or adjusted under 35 U.S.C. 154(b) by 0 days.

(21) Appl. No.: 16/714,161

(22) Filed: Dec. 13, 2019

(65) Prior Publication Data

US 2020/0116064 A1     Apr. 16, 2020

Related U.S. Application Data

(63) Continuation-in-part of application No. 15/618,733, filed on Jun. 9, 2017, now Pat. No. 10,584,623.

(51) Int. Cl.
    *F01N 5/02*      (2006.01)
    *F02M 26/17*     (2016.01)
    (Continued)

(52) U.S. Cl.
    CPC .............. *F01N 5/02* (2013.01); *F01N 1/165* (2013.01); *F01N 3/0205* (2013.01);
    (Continued)

(58) Field of Classification Search
CPC combination set(s) only.
See application file for complete search history.

(56) References Cited

U.S. PATENT DOCUMENTS 6,141,961 A  \*   11/2000   Rinckel ..................... F01N 5/02
                                                                                      60/288
7,527,126 B2     5/2009   Kuroda et al.
(Continued)

FOREIGN PATENT DOCUMENTS

DE     102018112514     12/2018
JP      2016044666      4/2016
(Continued)

*Primary Examiner* — Binh Q Tran
(74) *Attorney, Agent, or Firm* — Barnes & Thornburg LLP

(57) ABSTRACT

A vehicle exhaust system includes an exhaust pipe defining an exhaust gas flow path, a heat recovery device connected to the exhaust pipe, and a diverter valve that controls exhaust gas flow between the exhaust pipe and heat recovery device. The diverter valve is moveable between at least a heat recovery mode where the diverter valve blocks flow through the exhaust pipe and directs flow into the heat recovery device, a full bypass acoustic mode where the diverter valve blocks flow through the heat recovery device and directs flow through the exhaust pipe, a transition mode where the diverter valve partially blocks flow through the heat recovery device and partially blocks flow through the exhaust pipe, and a partial bypass acoustic mode where the diverter valve blocks flow through the heat recovery device and partially blocks flow through the exhaust pipe.

12 Claims, 11 Drawing Sheets

(51) Int. Cl.
*F02M 35/10* (2006.01)
*F02D 41/00* (2006.01)
*F02M 26/52* (2016.01)
*F01N 3/02* (2006.01)
*F01N 1/16* (2006.01)

(52) U.S. Cl.
CPC ......... *F02D 41/0077* (2013.01); *F02M 26/17* (2016.02); *F02M 26/52* (2016.02); *F02M 35/10222* (2013.01)

(56) References Cited

U.S. PATENT DOCUMENTS

| | | | |
|---|---|---|---|
| 7,621,128 B2* | 11/2009 | Czarnowski | F01N 3/021 60/605.2 |
| 8,397,863 B2 | 3/2013 | Paze | |
| 9,909,541 B1 | 3/2018 | Bevan et al. | |
| 10,316,801 B2* | 6/2019 | Zhang | F02M 26/24 |
| 2007/0068500 A1* | 3/2007 | Joergl | F02M 26/15 123/568.24 |
| 2014/0251579 A1* | 9/2014 | Sloss | F01N 5/02 165/96 |
| 2016/0169075 A1 | 6/2016 | Dobryden et al. | |

FOREIGN PATENT DOCUMENTS

| | | |
|---|---|---|
| JP | 2016102446 A | 6/2016 |
| WO | 2006006385 | 1/2006 |

* cited by examiner

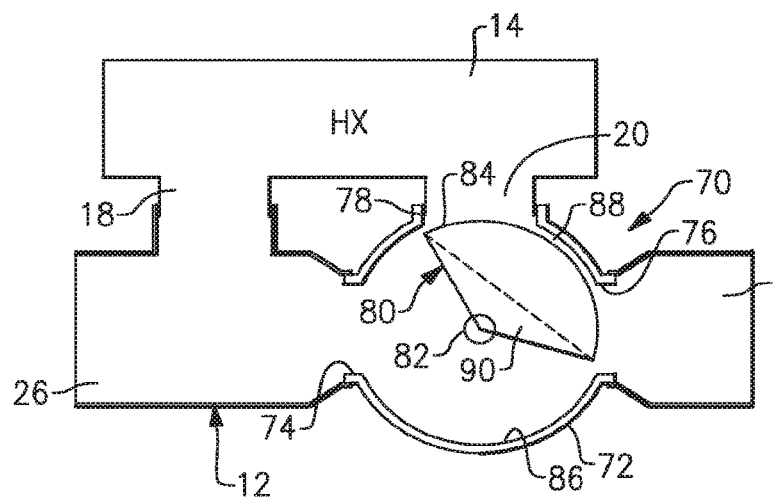 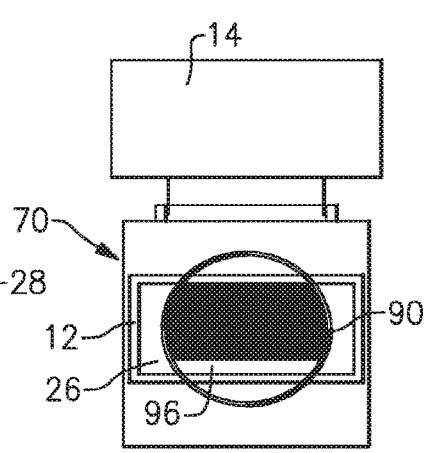
FIG.8A  FIG.8B
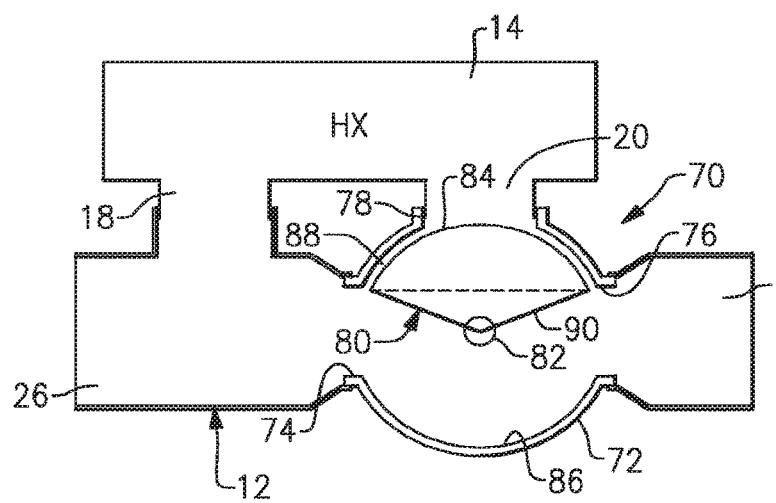 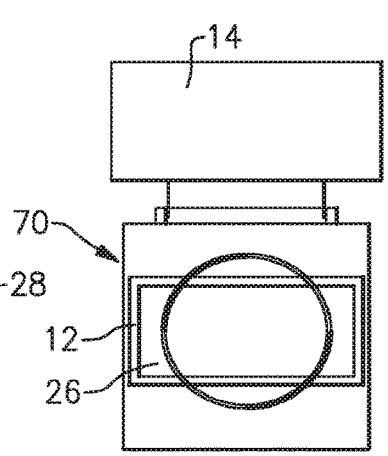
FIG.9A  FIG.9B

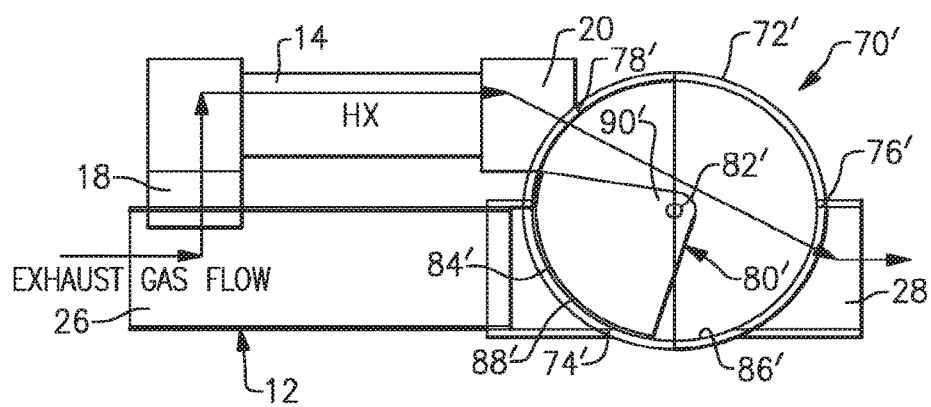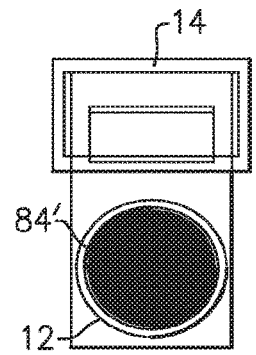
FIG.10A  FIG.10B
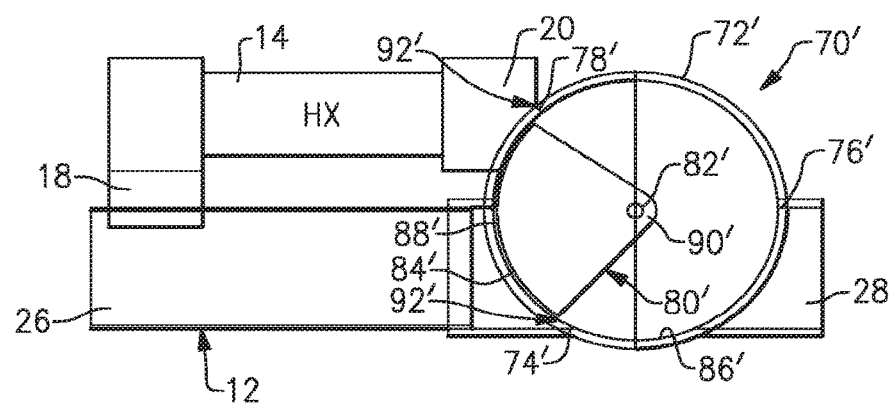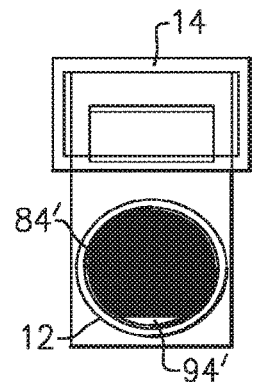
FIG.11A  FIG.11B

EXHAUST HEAT RECOVERY AND ACOUSTIC VALVE WITH EXHAUST GAS RECIRCULATION FEATURES

PRIORITY CLAIM

This application is a continuation-in-part of U.S. patent application Ser. No. 15/618,733, filed on Jun. 9, 2017, the disclosure of which is incorporated by reference herein in its entirety.

BACKGROUND

An exhaust system conducts hot exhaust gases generated by an engine through various exhaust components to reduce emissions and control noise. The heat energy contained in exhaust gases represents almost a third of the energy contained in the fuel. An exhaust heat recovery system (EHRS) is used to transfer this energy to another vehicle device or to a fluid, such as a coolant liquid for example. The EHRS includes a valve that is positioned within an exhaust system component to control exhaust flow into a heat exchanger.

Traditional exhaust systems also include acoustic valves that are used for noise attenuation purposes. Often multiple acoustic valves are required, dependent upon the type of vehicle application, to address specific ranges of noise such as low and high frequency noises. The incorporation of multiple valves for noise control and the EHRS significantly increases the cost of the exhaust system.

SUMMARY

In one exemplary embodiment, a vehicle exhaust system includes an exhaust pipe defining an exhaust gas flow path, a heat recovery device connected to the exhaust pipe, and a diverter valve that controls exhaust gas flow between the exhaust pipe and heat recovery device. The diverter valve is moveable between at least a heat recovery mode where the diverter valve blocks flow through the exhaust pipe and directs flow into the heat recovery device, a full bypass acoustic mode where the diverter valve blocks flow through the heat recovery device and directs flow through the exhaust pipe, a transition mode where the diverter valve partially blocks flow through the heat recovery device and partially blocks flow through the exhaust pipe, and a partial bypass acoustic mode where the diverter valve blocks flow through the heat recovery device and partially blocks flow through the exhaust pipe.

In a further embodiment of the above, the diverter valve comprises a single valve for exhaust heat recovery and acoustic noise control.

In a further embodiment of any of the above, the heat recovery device is mounted in parallel to the exhaust pipe and has a device inlet in fluid communication with the exhaust pipe and a device outlet in fluid communication with the exhaust pipe, the device outlet being downstream of the device inlet.

In a further embodiment of any of the above, a barrel housing connects the exhaust pipe to the device outlet, and wherein the diverter valve is rotatably mounted within the barrel housing.

In a further embodiment of any of the above, the diverter valve comprises a valve body having a first opening, a second opening facing opposite the first opening, and a third opening positioned between the first and second openings, and wherein the valve body includes a curved portion facing an inner surface of the barrel housing.

In a further embodiment of any of the above, the diverter valve has an outermost peripheral surface that does not contact an inner surface of the barrel housing as the diverter valve rotates within the barrel housing.

In a further embodiment of any of the above, the system further includes a curved valve housing connecting the exhaust pipe to the device outlet, the curved housing having a first opening in fluid communication with an upstream portion of the exhaust pipe, a second opening downstream of the first opening and in fluid communication with the exhaust pipe, and a third opening in fluid communication with the device outlet, and wherein the diverter valve comprises a valve body supported on a shaft for rotation relative to the curved housing, the valve body includes a curved portion spaced apart from an inner surface of the barrel housing by a gap.

In a further embodiment of any of the above, the system further includes an electronic controller that controls movement of the diverter valve between the heat recovery mode, the full bypass acoustic mode, the transition mode, and the partial bypass acoustic mode.

One exemplary method of controlling exhaust gas flow through a vehicle exhaust system comprises: connecting a heat recovery device to an exhaust pipe; and positioning a diverter valve to control exhaust gas flow between the exhaust pipe and the heat recovery device such that the diverter valve is moveable between at least the heat recovery mode, the full bypass acoustic mode, the transition mode, and the partial bypass acoustic mode.

According to another aspect of the present disclosure, an exhaust system includes an exhaust pipe defining a primary exhaust flow path; a heat recovery device connected to the exhaust pipe, an exhaust gas recirculation unit coupled to the heat recovery device, and a diverter valve. The heat recovery device defines a heat recovery flow path. The exhaust gas recirculation unit is configured to recirculate selected exhaust gas back to an engine intake manifold for mixing with fresh air that enters the engine. The exhaust gas recirculation includes a recirculation conduit defining a recirculation flow path and a recirculation valve that controls flow of the selected exhaust gas through the recirculation flow path. The diverter valve is moveable between a heat recovery mode, a full bypass acoustic mode, and a partial bypass acoustic mode.

These and other features of this application will be best understood from the following specification and drawings, the following of which is a brief description.

BRIEF DESCRIPTIONS OF THE DRAWINGS

The detailed description particularly refers to the accompanying figures in which:

FIG. 8A is a side view of another example of a diverter valve in a partial bypass acoustic mode.

FIG. 8B is an inlet end view of the diverter valve of FIG. 8A.

FIG. 9A is a side view of another example of a diverter valve in a full bypass acoustic mode.

FIG. 9B is an inlet end view of the diverter valve of FIG. 9A.

FIG. 10A is a side view of another example of a diverter valve in a heat recovery mode.

FIG. 10B is an inlet end view of the diverter valve of FIG. 10A.

FIG. 11A is a side view of another example of a diverter valve in a transition mode.

FIG. 11B is an inlet end view of the diverter valve of FIG. 11A.

DETAILED DESCRIPTION

Figure 1A:
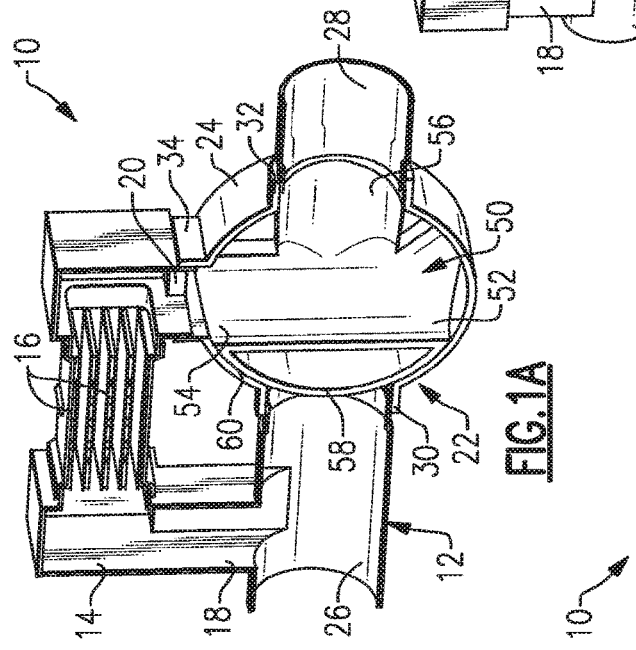
FIG. 1A is a perspective section view of a diverter valve in a heat recovery mode.

For FIG. 1 shows a portion of a vehicle exhaust system 10 that conducts hot exhaust gases generated by an engine through various exhaust components to reduce emission and control noise as known. The various exhaust components can include one or more of the following: pipes, filters, valves, catalysts, mufflers etc. After passing though the various exhaust components, the engine exhaust gas exits the system 10 to atmosphere as known.

In one example configuration shown in FIG. 1, the vehicle exhaust system includes an exhaust pipe 12 defining an exhaust gas flow path and a heat recovery device 14 connected to the exhaust pipe 12. In one example, the heat recovery device 14 comprises a heat exchanger with a plurality of heat transfer fins or plates 16. The heat recovery device 14 has a device inlet 18 in fluid communication with the exhaust pipe 12 and a device outlet 20 in fluid communication with the exhaust pipe 12 downstream from the device inlet 18. In one example, the heat recovery device 14 is in parallel with the exhaust pipe 12 to provide a bypass configuration.

The vehicle exhaust system 10 further includes a diverter valve 22 that controls exhaust gas flow between the exhaust pipe 12 and heat recovery device 14. The diverter valve 22 is moveable between at least a heat recovery mode where the diverter valve 22 blocks flow through the exhaust pipe 12 and directs flow into the heat recovery device 14 (FIGS. 1A-1C), a transition mode where the diverter valve 22 partially blocks flow through the heat recovery device 14 and partially blocks flow through the exhaust pipe 12 (FIGS. 2A-2C), and a partial bypass acoustic mode where the diverter valve 22 blocks flow through the heat recovery device 14 and partially blocks flow through the exhaust pipe (FIGS. 3A-3C), and a full bypass acoustic mode where the diverter valve 22 blocks flow through the heat recovery device 14 and directs flow through the exhaust pipe (FIGS. 4A-4C).

The subject diverter valve 22 comprises a single valve that is used for both exhaust heat recovery and acoustic noise control. The valve 22 provides a simple binary valve function for the exhaust heat recovery (heat recovery mode or full bypass mode) as well as providing a variable valve function for acoustic throttling. The diverter valve 22 is mounted at the device outlet 20. The valve 22 is configured such that an outermost peripheral surface of the valve 22 does not come into contact with any inner wall surface within the exhaust pipe 12 or heat recovery device 14. As such, there will always be some mixing of flow through the device outlet 20 of heat recovery device 14 and exhaust pipe 12 at all times.

In the example shown in FIGS. 1A-5, the exhaust system 10 includes a barrel housing 24 that connects the device outlet 20 to the exhaust pipe 12. The exhaust pipe 12 has an upstream end 26 and a downstream end 28. The barrel housing 24 is connected to the exhaust pipe 12 between the upstream 26 and downstream 28 ends. The barrel housing 24 has a housing inlet 30 connected to the exhaust pipe 12 and has a housing outlet 32 connected to the exhaust pipe 12. The housing outlet 32 is downstream of the device outlet 20. Further, the barrel housing 24 includes a second housing inlet 34 that is connected to the device outlet 20.

Figure 5:
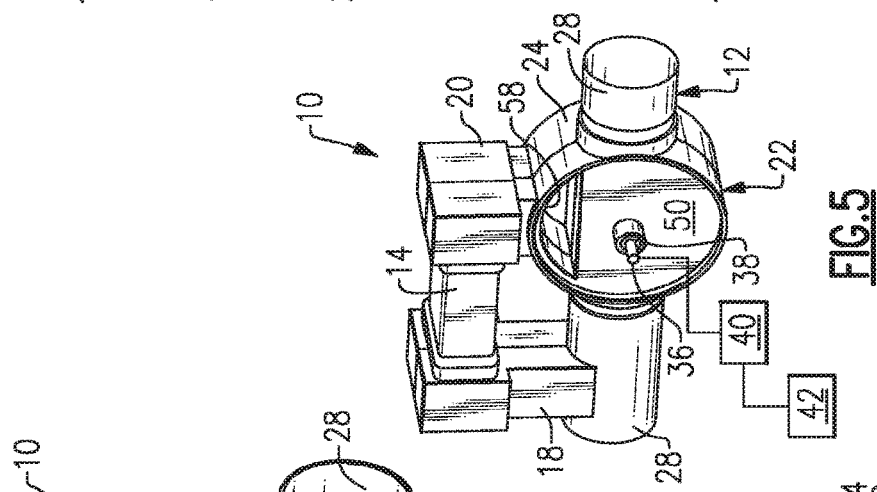
FIG. 5 is a perspective view of the diverter valve with an end cover of the housing removed.

As shown in FIG. 5, the diverter valve 22 is rotatably mounted within the barrel housing 24. The valve 22 is fixed for movement with a shaft 36 that is supported on a bearing 38. The shaft 36 is configured to rotate the valve 22 amongst the various operational positions. The shaft 36 is coupled to a valve drive 40, such as a motor, solenoid actuator, etc., which actively controls rotation of the shaft 36. An electronic control unit 42 generates signals to control the valve drive 40.

As shown in FIGS. 1A-4C, the diverter valve 22 comprises a valve body 50 having a first opening 52, a second opening 54 facing opposite the first opening 52, and a third opening 56 positioned between the first 52 and second 54 openings. The valve body 50 includes a curved portion 58 facing an inner surface 60 of the barrel housing 24. In the example shown, the curved portion 58 faces opposite of the third opening 56. Further, in one example, the first opening 52 has an increased area and tapered inlet to improve flow characteristics through the valve body 50.

Figure 1B:
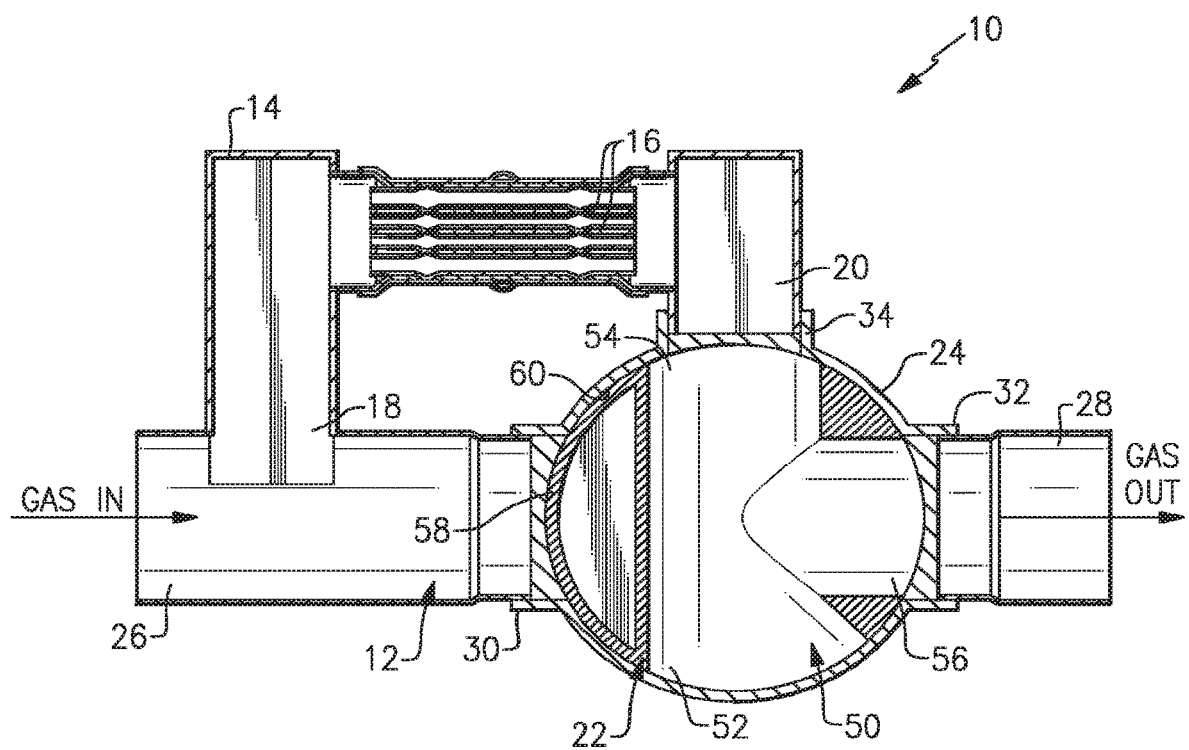
FIG. 1B is a side view of the diverter valve of FIG. 1A.
Figure 1C:
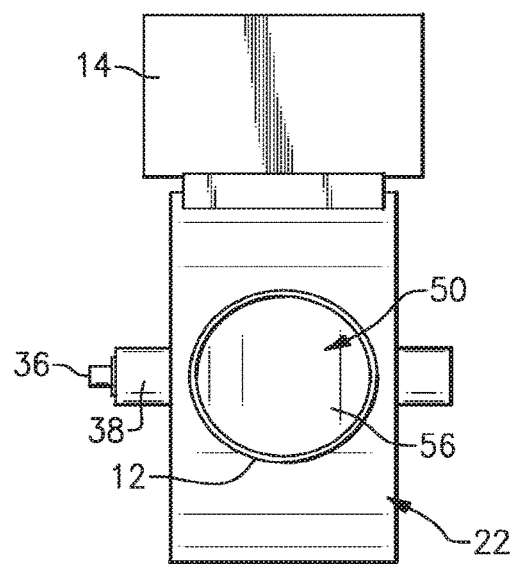
FIG. 1C is an outlet end view of the diverter valve of FIG. 1A.

FIGS. 1A-1C show the diverter valve 22 in the heat recovery mode where substantially all of the exhaust gas flow entering the upstream end 26 of the exhaust pipe 12 is directed into the device inlet 18. In this operational mode, the curved portion 58 blocks flow through the exhaust pipe 12, the first opening 52 is blocked by the barrel housing 24, the second opening 54 is fluidly connected to the device outlet 20, and the third opening 56 directs flow from the device outlet 20 back into the downstream end 28 of the exhaust pipe 12. The outermost surface of the curved portion 58 is spaced apart from the inner surface 60 of the barrel housing 24 by a small gap, i.e. the curved portion does not make contact with the housing 24. As such, a small amount of exhaust gas flows around the curved portion 58 to mix with exhaust gas exiting the device outlet 20; however, as shown in FIG. 1C, the valve body 50 is configured such that the flow path through the exhaust pipe is substantially blocked to achieve the full heat recovery mode.

Figure 2A:
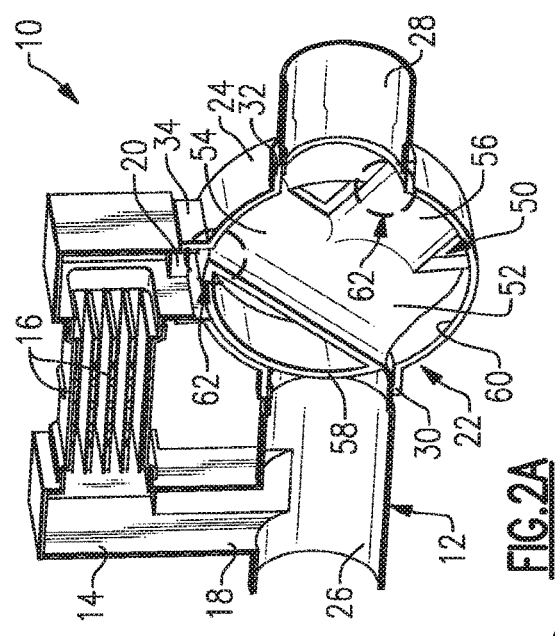
FIG. 2A is a perspective section view of a diverter valve in a transition mode.
Figure 2B:
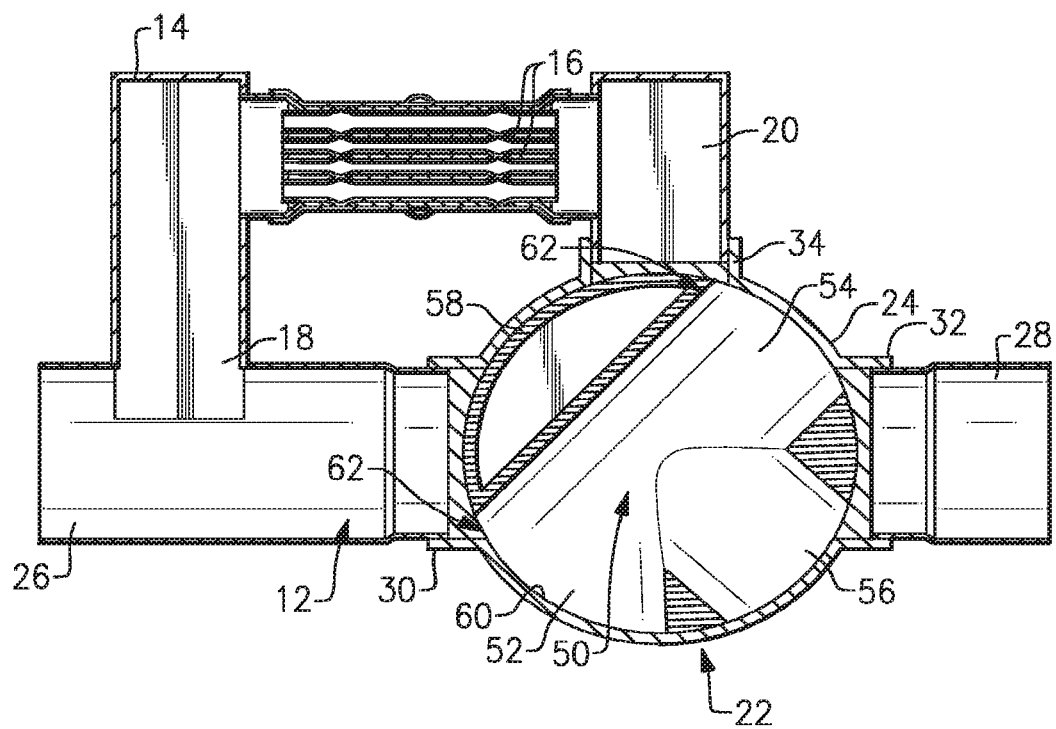
FIG. 2B is a side view of the diverter valve of FIG. 2A.
Figure 2C:
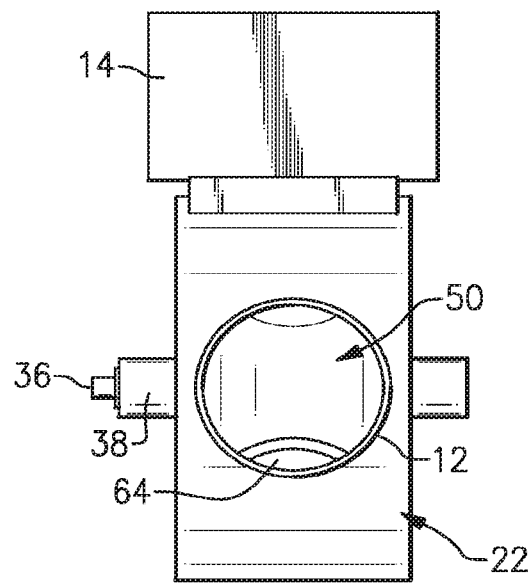
FIG. 2C is an outlet end view of the diverter valve of FIG. 2A.

FIGS. 2A-2C show the diverter valve 22 in the transition mode wherein exhaust gas flowing through the exhaust pipe 12 mixes with exhaust gas exiting the device outlet 20 as indicated at 62 in FIG. 2B. In this mode, the curved portion 58 partially blocks flow at the device outlet 20 and partially blocks flow through the exhaust pipe 12, the first opening 52 receives partial flow from the exhaust pipe 12, the second opening 54 receives partial flow from the device outlet 20, and the third opening 56 directs flow from first 52 and second 54 openings into the downstream end 28 of the exhaust pipe 12. As shown in FIG. 2C, a small amount of exhaust flows directly through the exhaust pipe 12, as indicated at 64, when in the transition mode.

Figure 3A:
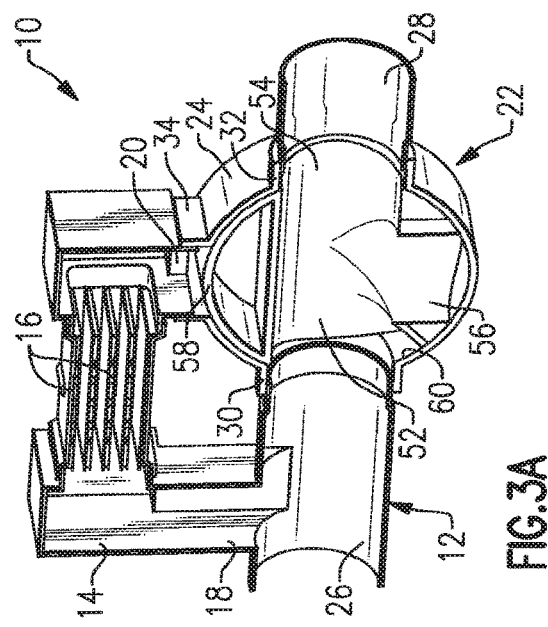
FIG. 3A is a perspective section view of a diverter valve in a full bypass acoustic mode.
Figure 4A:
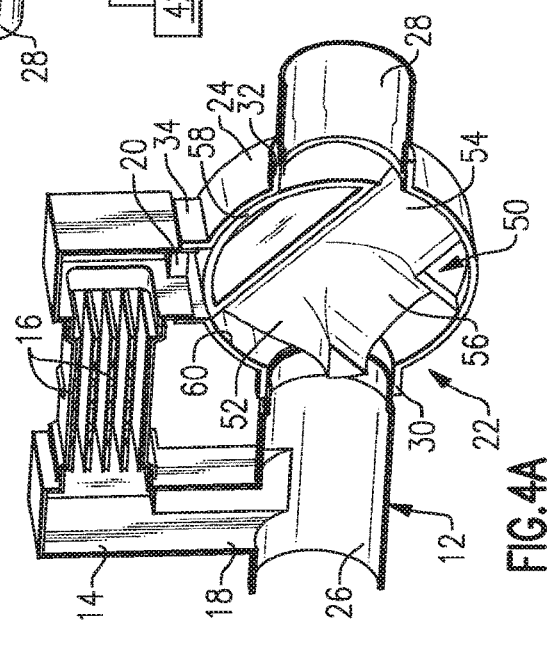
FIG. 4A is a perspective section view of a diverter valve in a partial bypass acoustic mode.
Figure 3B:
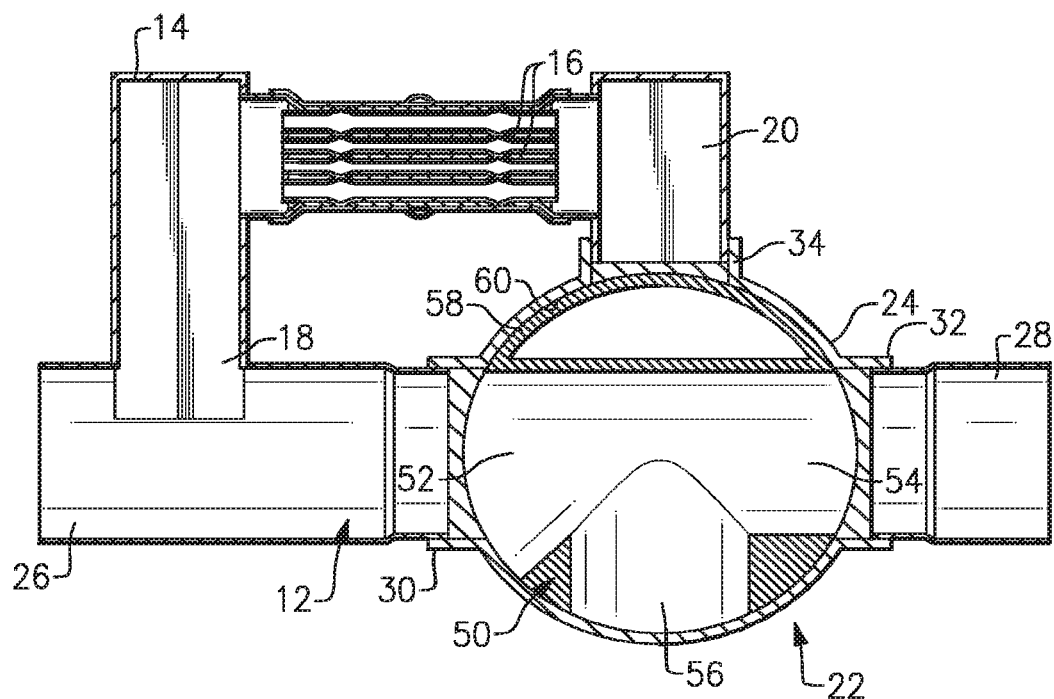
FIG. 3B is a side view of the diverter valve of FIG. 3A.
Figure 3C:
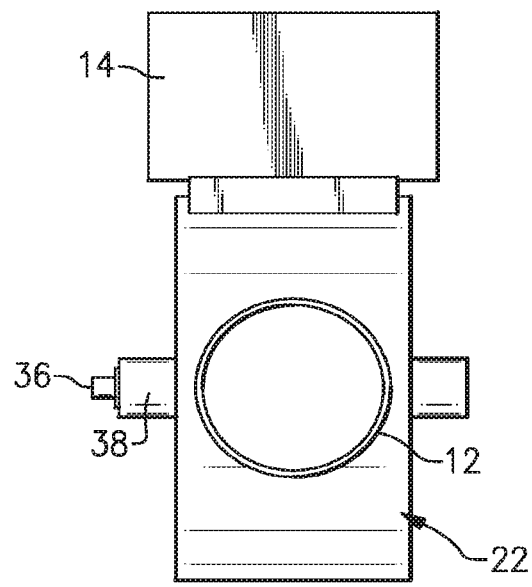
FIG. 3C is an outlet end view of the diverter valve of FIG. 3A.
Figure 4B:
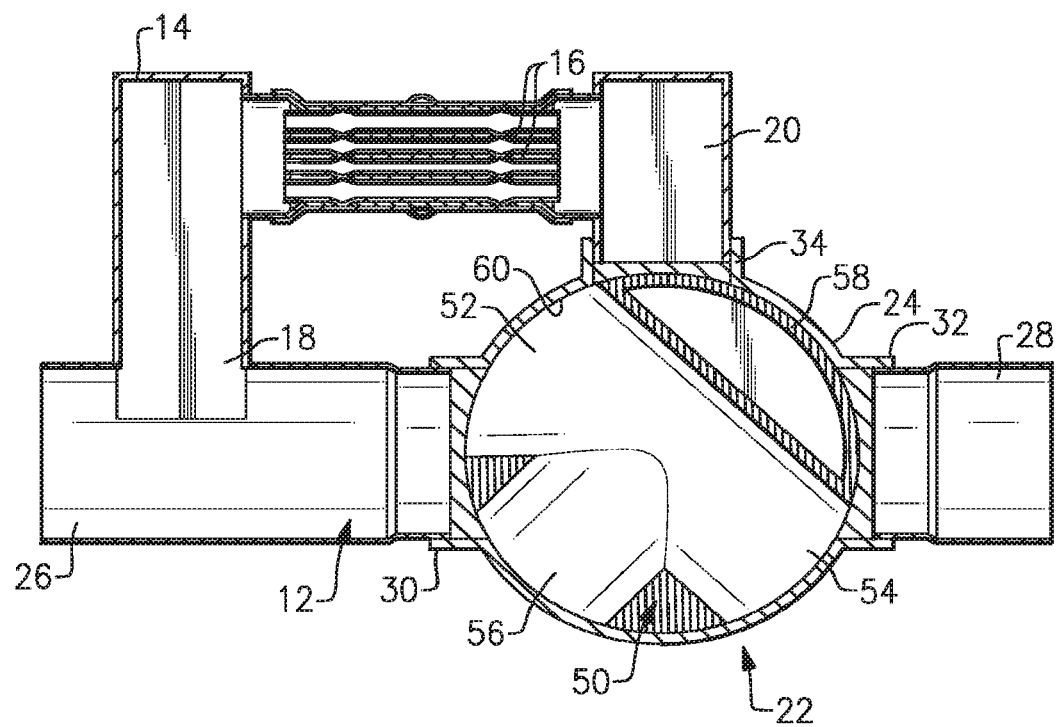
FIG. 4B is a side view of the diverter valve of FIG. 4A.
Figure 4C:
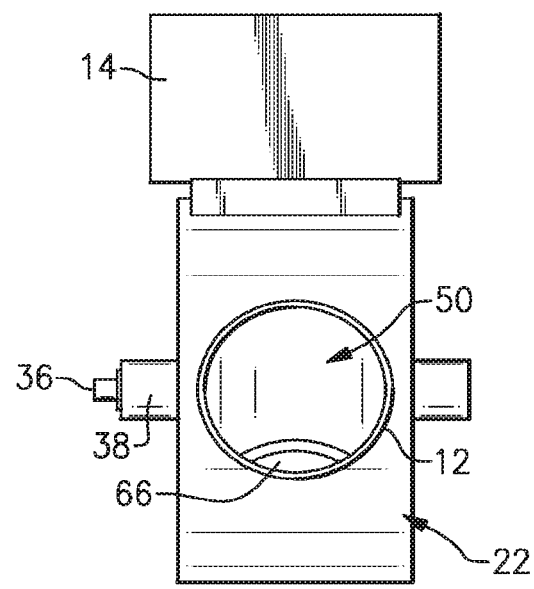
FIG. 4C is an outlet end view of the diverter valve of FIG. 4A.

FIGS. 3A-3C show the diverter valve 22 in the full bypass acoustic mode where exhaust gas bypasses the heat recovery device 14 such that substantially all exhaust gas flows through the exhaust pipe 12 from the upstream end 26 to the downstream end 28. In this mode, the curved portion 58 blocks flow at the device outlet 20, the first opening 52 receives flow from the upstream end 26 of the exhaust pipe 12, the second opening 54 directs flow from the first opening 52 into the downstream end 28 of the exhaust pipe 12, and the third opening 56 is blocked by the barrel housing 24. As shown in FIG. 3C, the valve body 50 does not block flow through the exhaust pipe 12 when in this mode.

FIGS. 4A-4C show the diverter valve 22 in the partial bypass acoustic mode where flow through the heat recovery device 14 is completely blocked while flow through the exhaust pipe 12 is only partially blocked. In this mode, the curved portion 58 blocks flow from the device outlet 20 and partially blocks flow through the exhaust pipe 12, the first opening 52 receives flow from the exhaust pipe 12, the third opening 56 receives flow from the exhaust pipe 12, and the second opening 54 directs flow from the first 52 and third 56 openings into the downstream end 28 of the exhaust pipe 12. As shown in FIG. 4C, a small amount of exhaust flows directly through the exhaust pipe 12, as indicated at 66, when in the partial bypass mode. In the example shown, approximately 10% of the exhaust flow is bypassing the heat recovery device 14 in this acoustic mode; however, the position of the curved portion 58 can be adjusted to increase or decrease this percentage in order to achieve a desired acoustic throttling.

As best shown in FIGS. 1A, 2A, 3A, 4A, and 5, the barrel housing 24 comprises a round housing that encloses the valve body 50 within. These figures show the housing 24 with one side cover portion removed such that the valve body 50 can be seen in the various operational positions. In one example, the valve body 50 comprises a single-piece body that has a T-shaped portion that includes the first 52, second 54, and third 56 openings. The curved portion 58 is positioned to round off the head portion of the T-shape. The curved portion 58 is also hollowed out in a central area to decrease the weight of the valve body 50. As discussed above, the valve body 50 is mounted for rotation with the shaft 56 within the barrel housing 24 between the various operational positions.

FIGS. 6A-9B show another example configuration of a diverter valve 70. This configuration operates similar to the diverter valve 22 described above, but has a different valve body configuration. Further, this configuration has a polygonal, i.e. multi-sided, shape for the exhaust pipe 12. In this example embodiment, a curved or barrel valve housing 72 connects the exhaust pipe 12 to the device outlet 20. The housing 72 has a first opening 74 in fluid communication with an upstream end 26 of the exhaust pipe 12, a second opening 76 downstream of the first opening 74 and in fluid communication with the downstream end 28 of the exhaust pipe 12, and a third opening 78 in fluid communication with the device outlet 20. In one example configuration, the first 74 and second 76 openings are spaced 180 degrees apart from each other while the third opening 78 is approximately spaced 90 degrees apart from the first 74 and second 76 openings.

The diverter valve 70 comprises a valve body 80 supported on a shaft 82 for rotation relative to the housing 72. The valve body 80 includes a curved portion 84 spaced apart from an inner surface 86 of the housing 72 by a gap 88. The curved portion 84 comprises a hemispherical shape in this configuration. The valve body 80 further includes a narrowing portion 90 that extends radially inwardly from opposing peripheral edges of the curved portion 84 to a mount interface to the shaft 82.

Figures 6A, 6B:
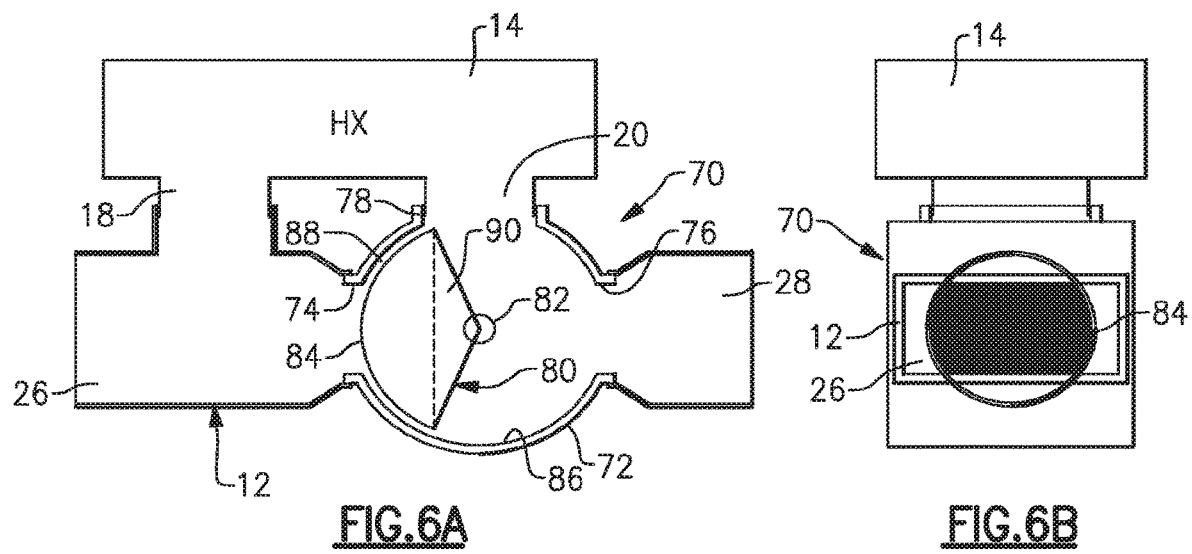
FIG. 6A is a side view of another example of a diverter valve in a heat recovery mode.
FIG. 6B is an inlet end view of the diverter valve of FIG. 6A.

FIGS. 6A-6B show the diverter valve 70 in the heat recovery mode where substantially all of the exhaust gas flow entering the upstream end 26 of the exhaust pipe 12 is directed into the device inlet 18. In this operational mode, the curved portion 84 blocks the first opening 74, flow is directed through the heat recovery device 14, flow exits the device outlet 20 and flows through the third opening 78, and flow exits the housing 72 via the second opening 76 and returns to the downstream end 28 of the exhaust pipe 12. As shown in FIG. 6B and as viewed from the inlet end, flow through the exhaust pipe 12 is substantially blocked by the valve body 80. However, due to the gap 88, a small amount of exhaust gas does bypass the body 80 to mix with the exhaust gas exiting the device outlet 20.

Figures 7A, 7B:
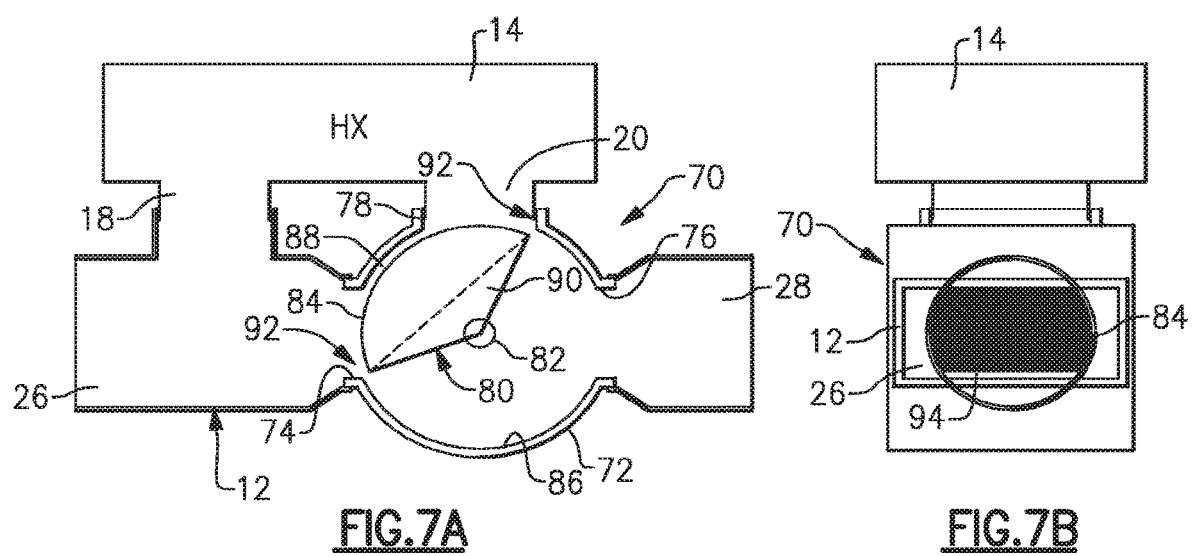
FIG. 7A is a side view of another example of a diverter valve in a transition mode.
FIG. 7B is an inlet end view of the diverter valve of FIG. 7A.

FIGS. 7A-7B show the diverter valve 70 in the transition mode where exhaust gas flowing through the exhaust pipe 12 mixes with exhaust gas exiting the device outlet 20 as indicated at 92 in FIG. 7A. In this mode, the curved portion 84 partially blocks the first opening 74, the curved portion 84 partially blocks the third opening 78, and flow entering the housing 72 from the first 74 and third 78 openings is directed through the second opening 76 and into the downstream end 28 of the exhaust pipe 12. As shown in FIG. 7B and as viewed from the inlet end, a small amount of exhaust flows directly through the exhaust pipe 12, as indicated at 94, when in the transition mode.

FIGS. 8A-8B show the diverter valve 70 in the partial bypass acoustic mode where flow through the heat recovery device 14 is completely blocked while flow through the exhaust pipe 12 is only partially blocked. In this mode, the curved portion 84 blocks the third opening 78 at the device outlet 20, the curved portion 84 partially blocks the second opening 76, and exhaust gas flows through the housing 72 from the first opening 74 to the second opening 76 and into the downstream end 28 of the exhaust pipe 12. As shown in FIG. 8B and as viewed from the inlet end, a small amount of exhaust flows directly through the exhaust pipe 12, as indicated at 96, when in the partial bypass mode. In the example shown, approximately 10% of the exhaust flow is bypassing the heat recovery device 14 in this acoustic mode; however, the position of the curved portion 84 can be adjusted to increase or decrease this percentage in order to achieve a desired acoustic throttling.

FIGS. 9A-9B show the diverter valve 70 in the full bypass acoustic mode where exhaust gas bypasses the heat recovery device 14 such that substantially all exhaust gas flows through the exhaust pipe 12 from the upstream end 26 to the downstream end 28. In this mode, the curved portion 84 blocks the third opening 78 at the device outlet 20, and exhaust gas flows through the housing 72 from the first opening 74 to the second opening and bypasses the heat recovery device. As shown in FIG. 9B as viewed from the inlet end, the valve body 80 does not block flow through the exhaust pipe 12 when in this mode.

FIGS. 10A-13B show another example configuration of a diverter valve 70'. This configuration operates similar to the diverter valve 70 described above, but has a different valve body configuration. Further, this configuration has a round pipe 12 instead of a polygonal pipe. In this example embodiment, a curved or barrel valve housing 72' connects the exhaust pipe 12 to the device outlet 20. The housing 72' has a first opening 74' in fluid communication with an upstream end 26 of the exhaust pipe 12, a second opening 76' downstream of the first opening 74' and in fluid communication with the downstream end 28 of the exhaust pipe 12, and a third opening 78' in fluid communication with the device outlet 20. In one example configuration, the first 74' and second 76' openings are spaced 180 degrees apart from each other while the third opening 78' is approximately spaced only 45 degrees from the first opening 74'.

The diverter valve 70' comprises a valve body 80' supported on a shaft 82' for rotation relative to the housing 72'. The valve body 80' includes a curved portion 84' spaced apart from an inner surface 86' of the housing 72' by a gap 88'. The curved portion 84' comprises a pie or wedge shape in this configuration. The curved portion 84' transitions radially inwardly to an apex area 90' at a mount interface to the shaft 82'.

FIGS. 10A-10B show the diverter valve 70' in the heat recovery mode where substantially all of the exhaust gas flow entering the upstream end 26 of the exhaust pipe 12 is directed into the device inlet 18. In this operational mode, the curved portion 84' blocks the first opening 74', flow is directed through the heat recovery device 14, flow exits the device outlet 20 and flows through the third opening 78', and flow exits the housing 72' via the second opening 76' and returns to the downstream end 28 of the exhaust pipe 12. As shown in FIG. 10B and as viewed from the inlet end, flow through the exhaust pipe 12 is substantially blocked by the valve body 80'. However, due to the gap 88', a small amount of exhaust gas does bypass the body 80' to mix with the exhaust gas exiting the device outlet 20.

FIGS. 11A-11B show the diverter valve 70' in the transition mode where exhaust gas flowing through the exhaust pipe 12 mixes with exhaust gas exiting the device outlet 20 as indicated at 92' in FIG. 11A. In this mode, the curved portion 84' partially blocks the first opening 74', the curved portion 84' partially blocks the third opening 78', and flow entering the housing 72' from the first 74' and third 78' openings is directed through the second opening 76' and into the downstream end 28 of the exhaust pipe 12. As shown in FIG. 11B and as viewed from the inlet end, a small amount of exhaust flows directly through the exhaust pipe 12, as indicated at 94', when in the transition mode.

Figures 12A, 12B:
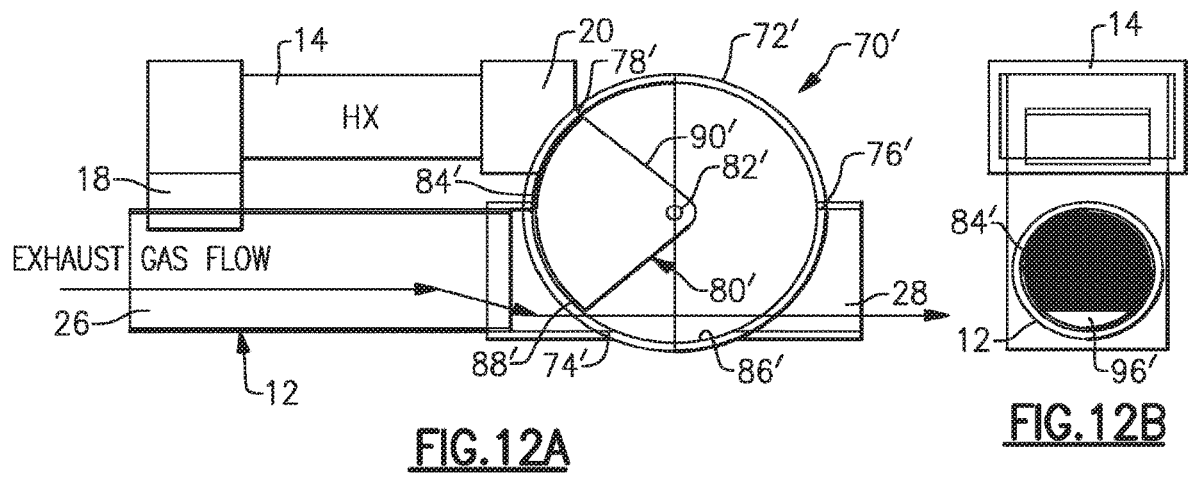
FIG. 12A is a side view of another example of a diverter valve in a partial bypass acoustic mode.
FIG. 12B is an inlet end view of the diverter valve of FIG. 12A.

FIGS. 12A-12B show the diverter valve 70' in the partial bypass acoustic mode where flow through the heat recovery device 14 is completely blocked while flow through the exhaust pipe 12 is only partially blocked. In this mode, the curved portion 84' blocks the third opening 78' at the device outlet 20, the curved portion 84' partially blocks the first opening 74', and exhaust gas flows through the housing 72' from the first opening 74' to the second opening 76' and into the downstream end 28 of the exhaust pipe 12. As shown in FIG. 12B and as viewed from the inlet end, a small amount of exhaust flows directly through the exhaust pipe 12, as indicated at 96', when in the partial bypass mode. In the example shown, approximately 10% of the exhaust flow is bypassing the heat recovery device 14 in this acoustic mode; however, the position of the curved portion 84' can be adjusted to increase or decrease this percentage in order to achieve a desired acoustic throttling.

Figures 13A, 13B:
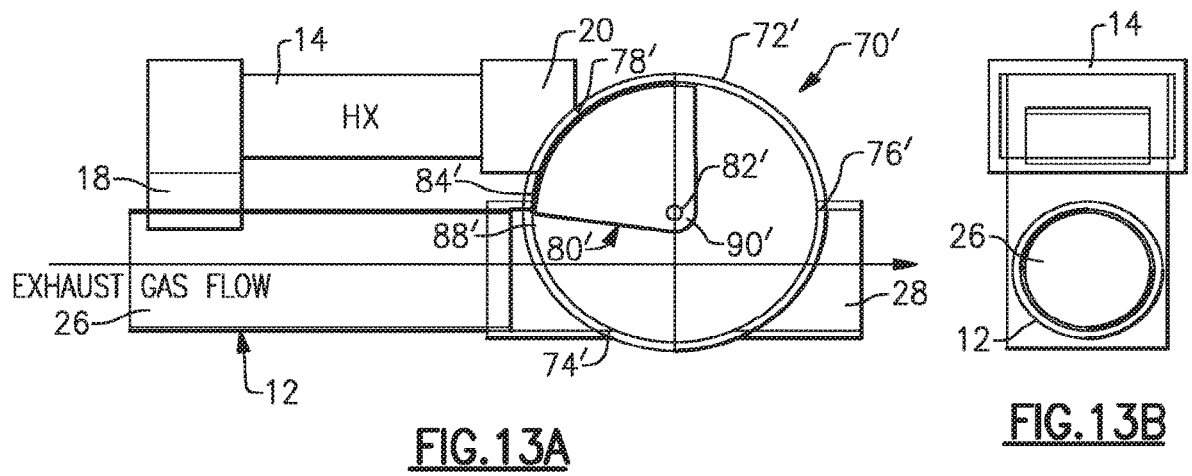
FIG. 13A is a side view of another example of a diverter valve in a full bypass acoustic mode.
FIG. 13B is an inlet end view of the diverter valve of FIG. 13A.

FIGS. 13A-13B show the diverter valve 70' in the full bypass acoustic mode where exhaust gas bypasses the heat recovery device 14 such that substantially all exhaust gas flows through the exhaust pipe 12 from the upstream end 26 to the downstream end 28. In this mode, the curved portion 84' blocks the third opening 78' at the device outlet 20, and exhaust gas flows through the housing 72' from the first opening 74' to the second opening and bypasses the heat recovery device 14. As shown in FIG. 13B as viewed from the inlet end, the valve body 80 does not block flow through the exhaust pipe 12 when in this mode.

In each of the examples, the outer peripheral surface of the rounded/curved portion of the valve body has a circumferential length that is greater than a width of the openings at the inlets to the valve housing. Thus, the valve body can be rotated to a position where the rounded portion can cover each inlet opening completely, and can also be rotated to a position where the rounded portion partially covers each opening simultaneously to provide a desired acoustic effect.

Further, by having both passages slightly open, with a very high mass flow rate, a low back pressure can be maintained while acquiring heat recovered power. Further, the heat recovery device can be used as an additional acoustic element and the gas temperature will be lower resulting in reduced tail pipe noise. Additionally, during transitional movement pressure spikes are minimized as neither inlet passage to the valve housing is ever completely closed.

Figure 14:
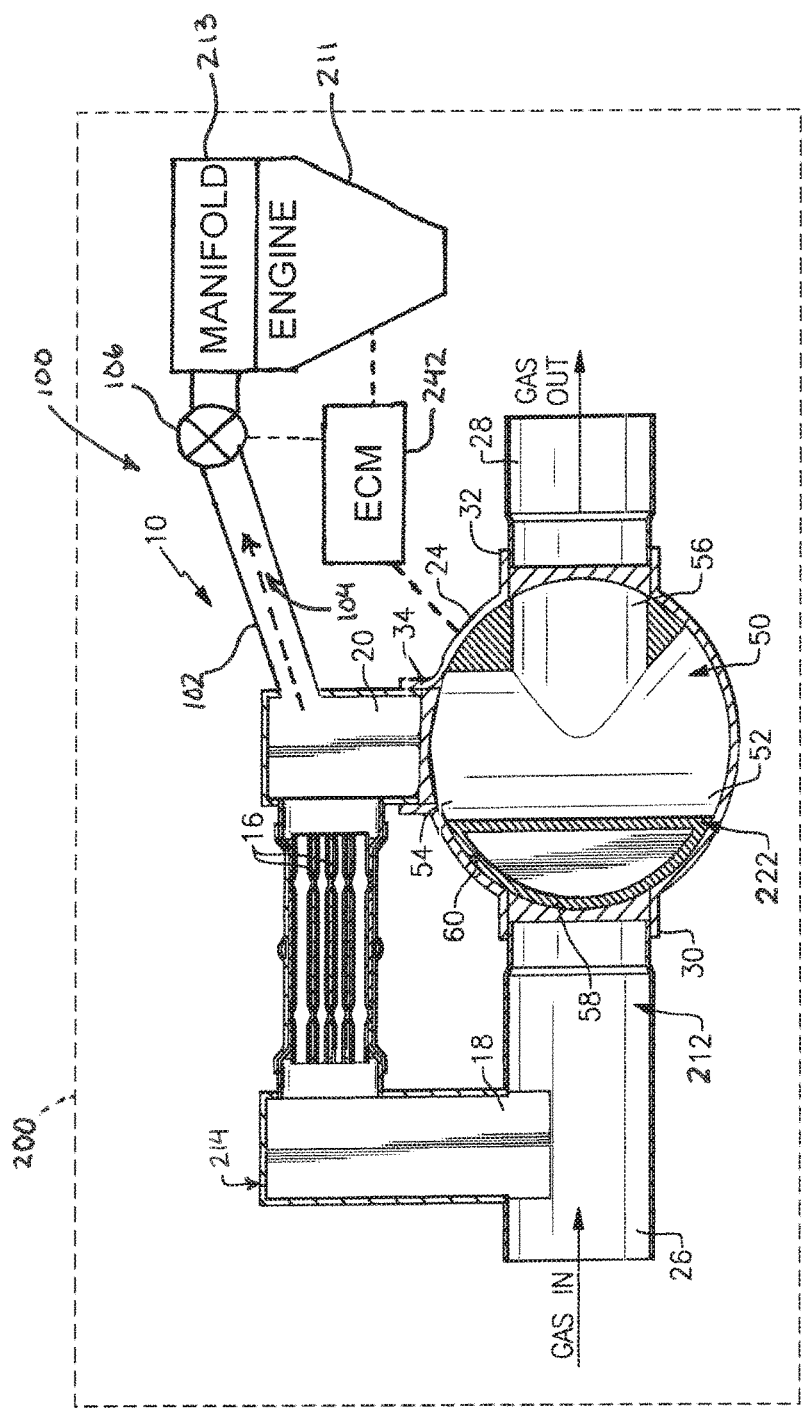
FIG. 14 is a side view of an engine exhaust component with the heat recovery device and the diverter valve shown in FIGS. 1-5 and showing an exhaust gas recirculation unit coupled to the heat recovery unit.

A diagrammatic vehicle 200 is shown in FIG. 14 and includes a combustion engine 211 and a vehicle exhaust system 210 coupled to the engine 211. The combustion engine 211 is configured to combust fuel and air during operation and produces exhaust gases that are discharged toward the vehicle exhaust system 210 and eventually reach atmosphere. The vehicle exhaust system 210 in accordance with the present disclosure includes an exhaust pipe 212 defining an exhaust gas flow path, a heat recovery device 214 connected to the exhaust pipe 212, a diverter valve 222, and an exhaust gas recirculation unit 100. The exhaust pipe 212, the heat recovery device 214, and the diverter valve 222 are substantially similar to exhaust pipe 12, heat recovery device 14, and diverter valve 22 shown in FIGS. 1-5 and described above. Accordingly, similar reference numbers are used to describe like features that are common between exhaust pipe 12, heat recovery device 14, and diverter valve 22 and exhaust pipe 212, heat recovery device 214, and diverter valve 222. The description for exhaust pipe 12, heat recovery device 14, and diverter valve 22 above is incorporated by reference herein for exhaust pipe 212, heat recovery device 214, and diverter valve 222 except where the disclosure of exhaust pipe 212, heat recovery device 214, and diverter valve 222 below explicitly departs from the disclosure of exhaust pipe 12, heat recovery device 14, and diverter valve 22 above.

In one example, the heat recovery device 14 comprises a heat exchanger with a plurality of heat transfer fins or plates 16. The heat recovery device 14 has a device inlet 18 in fluid communication with the exhaust pipe 12 and a device outlet 20 in fluid communication with the exhaust pipe 12 downstream from the device inlet 18. In one example, the heat recovery device 14 is in parallel with the exhaust pipe 12 to provide a bypass configuration.

As shown in FIG. 14, the diverter valve 22 comprises a valve body 50 having a first opening 52, a second opening 54 facing opposite the first opening 52, and a third opening 56 positioned between the first 52 and second 54 openings. The valve body 50 includes a curved portion 58 facing an inner surface 60 of the barrel housing 24. In the example shown, the curved portion 58 faces opposite of the third opening 56. Further, in one example, the first opening 52 has an increased area and tapered inlet to improve flow characteristics through the valve body 50.

The diverter valve 22 comprises a single valve that is used for both exhaust heat recovery and acoustic noise control. The valve 22 provides a simple binary valve function for the exhaust heat recovery (heat recovery mode or full bypass mode) as well as providing a variable valve function for acoustic throttling. The diverter valve 22 is moveable between at least a heat recovery mode where the diverter valve 22 blocks flow through the exhaust pipe 12 and directs flow into the heat recovery device 14 (FIGS. 1A-1C), a transition mode where the diverter valve 22 partially blocks flow through the heat recovery device 14 and partially blocks flow through the exhaust pipe 12 (FIGS. 2A-2C), and a partial bypass acoustic mode where the diverter valve 22 blocks flow through the heat recovery device 14 and partially blocks flow through the exhaust pipe (FIGS. 3A-3C), and a full bypass acoustic mode where the diverter valve 22 blocks flow through the heat recovery device 14 and directs flow through the exhaust pipe (FIGS. 4A-4C).

The exhaust gas recirculation unit 100 is used to remove selected exhaust gases from the heat recovery device 214 and direct the selected exhaust gases toward an air-intake manifold 213 coupled to the engine 211. The selected exhaust gases are exhaust gases that have been cooled by the heat recovery device 214. The selected exhaust gases are introduced into the air-intake manifold 213 for reuse with the engine 211 in an additional combustion process which reduces an overall temperature of the combustion process and improves efficiencies of the engine 211.

The exhaust gas recirculation unit 100 is integrated with the exhaust pipe 212 and the heat recovery device 214 to reduce the number of parts in the exhaust system 210 by removing the need for separate exhaust gas recirculation (EGR) elsewhere in the vehicle 200. The exhaust gas recirculation unit 100 is coupled to the heat recovery device 214 downstream of the heat exchanger. The exhaust gas recirculation unit 100 includes a recirculation conduit 102 defining a recirculation flow path 104 and a recirculation valve 106 coupled to the recirculation conduit 102. The recirculation conduit interconnects the heat recovery device 214 and the air-intake manifold 213 of the engine 211. The recirculation valve 106 controls flow of the selected exhaust gas through the recirculation flow path 104 to selectively introduce the selected exhaust gases into the air-intake manifold 213 in certain conditions.

Figure 15A:
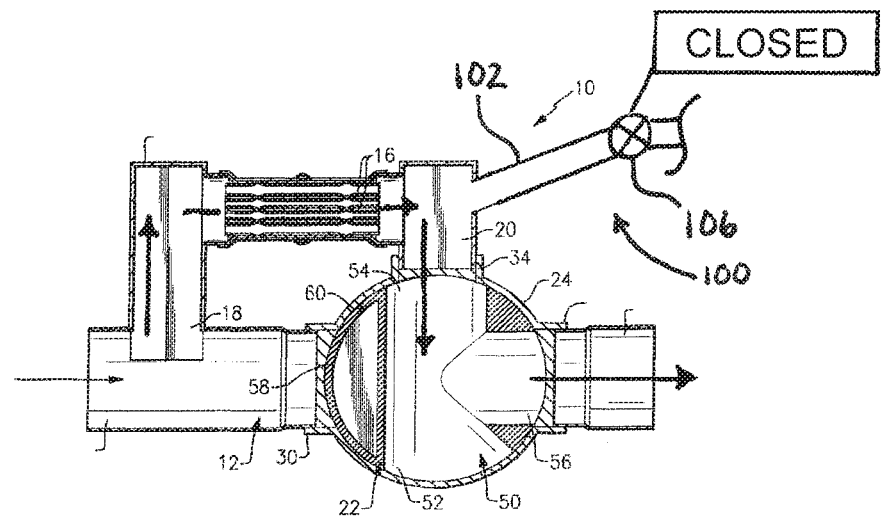
FIG. 15A is a side view of the engine exhaust component of FIG. 14 with the diverter valve in the heat recovery mode and a recirculation valve of the exhaust gas recirculation unit in a closed position.
Figure 15B:
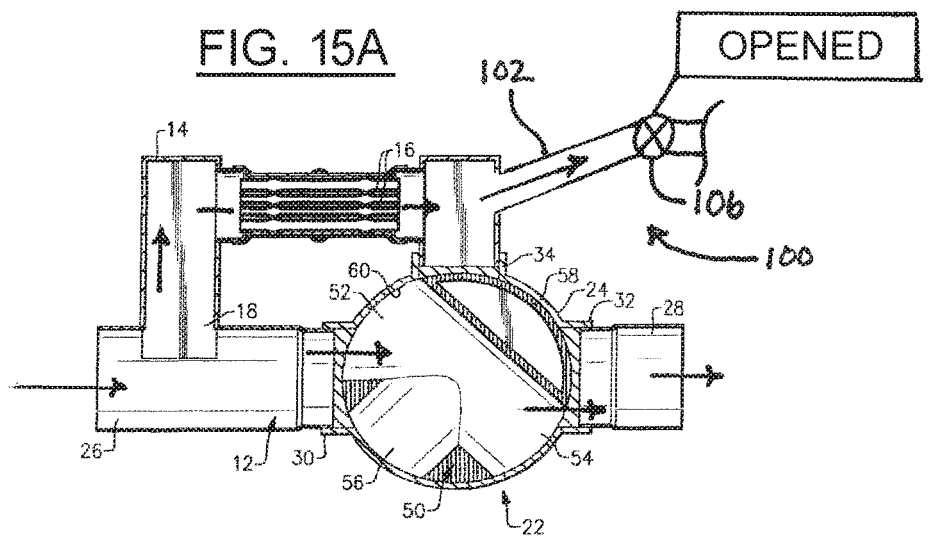
FIG. 15B is a side view of the engine exhaust component of FIG. 14 with the diverter valve in the partial bypass acoustic mode and the recirculation valve in an opened position to allow a cooled exhaust gas flow to enter the exhaust gas recirculation unit for use by an engine.
Figure 15C:
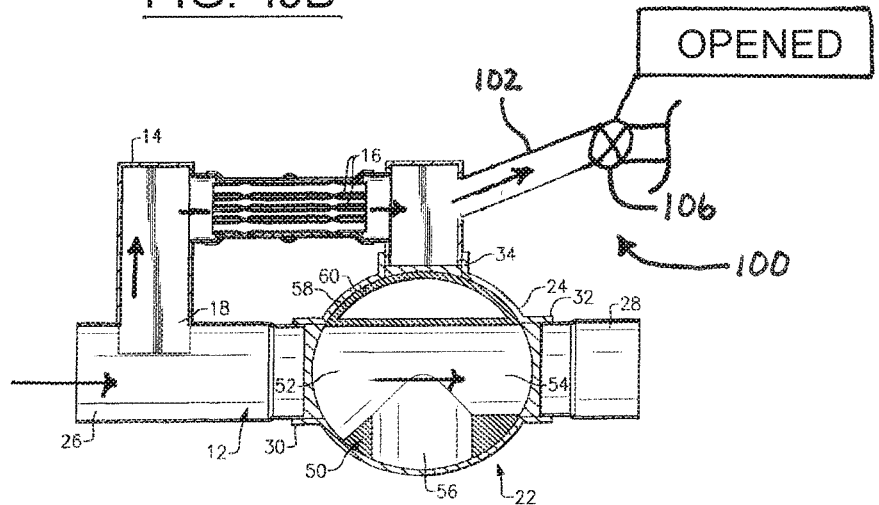
FIG. 15C is a side view of the engine exhaust component of FIG. 14 with the diverter valve in the full bypass acoustic mode and the recirculation valve in an opened position to allow the cooled exhaust gas flow to enter the exhaust gas recirculation unit for use by the engine.

FIGS. 15A-15C show the diverter valve 222 in the heat recovery mode, the partial bypass acoustic mode, and the full bypass acoustic mode, respectively. A controller 242 is coupled to both the diverter valve 222 and the recirculation valve 106. The controller 242 is illustratively embodied as an engine control module (ECM) or an engine control unit (ECU) and includes a processor and a memory storage device. The memory storage device stores instructions that, when executed by the processor, cause the diverter valve 222 and the recirculation valve 106 to change configurations. The controller 242 is configured to send signals to both the diverter valve 222 and the recirculation valve 106 to synchronize movement of the diverter valve with movement of the recirculation valve.

FIG. 15A shows the diverter valve 222 in the heat recovery mode where substantially all of the exhaust gas flow entering the upstream end 26 of the exhaust pipe 212 is directed into the device inlet 18. In this operational mode, the curved portion 58 blocks flow through the exhaust pipe 212, the first opening 52 is blocked by barrel housing 24, the second opening 54 is fluidly connected to the device outlet 20, and the third opening 56 directs flow from the device outlet 20 back into the downstream end 28 of the exhaust pipe 12. In the heat recovery mode, the recirculation valve 106 is in a closed position so that no selected exhaust gases are directed through the recirculation conduit 102 to the air-intake manifold 213. The outermost surface of the curved portion 58 is spaced apart from the inner surface 60 of the barrel housing 24 by a small gap, i.e. the curved portion does not make contact with the housing 24. As such, a small amount of exhaust gas flows around the curved portion 58 to mix with exhaust gas exiting the device outlet 20; however, as shown in FIG. 15A, the valve body 50 is configured such that the flow path through the exhaust pipe is substantially blocked to achieve the full heat recovery mode.

FIG. 15B shows the diverter valve 222 in the partial bypass acoustic mode where flow through the heat recovery device 14 is completely blocked while flow through the exhaust pipe 12 is only partially blocked. In this mode, the curved portion 58 blocks flow from the device outlet 20 and partially blocks flow through the exhaust pipe 12, the first opening 52 receives flow from the exhaust pipe 212, the third opening 56 receives flow from the exhaust pipe 212, and the second opening 54 directs flow from the first 52 and third 56 openings into the downstream end 28 of the exhaust pipe 212. In the partial bypass acoustic mode, the recirculation valve 106 is in an opened position so that the selected exhaust gases are directed through the recirculation conduit 102 to the air-intake manifold 213. As shown in FIG. 15B, a small amount of exhaust flows directly through the exhaust pipe 212, as indicated at 66, when in the partial bypass mode. In the example shown, approximately 10% of the exhaust flow is bypassing the heat recovery device 14 in this acoustic mode; however, the position of the curved portion 58 can be adjusted to increase or decrease this percentage in order to achieve a desired acoustic throttling.

FIG. 15C shows the diverter valve 22 in the full bypass acoustic mode where exhaust gas bypasses the heat recovery device 14 such that substantially all exhaust gas flows through the exhaust pipe 12 from the upstream end 26 to the downstream end 28. In this mode, the curved portion 58 blocks flow at the device outlet 20, the first opening 52 receives flow from the upstream end 26 of the exhaust pipe 12, the second opening 54 directs flow from the first opening 52 into the downstream end 28 of the exhaust pipe 12, and the third opening 56 is blocked by the barrel housing 24. In the full bypass acoustic mode, the recirculation valve 106 is in the opened position so that the selected exhaust gases are directed through the recirculation conduit 102 to the air-intake manifold 213. As shown in FIG. 15C, the valve body 50 does not block flow through the exhaust pipe 12 when in this mode.

In some embodiments, the recirculation valve 106 may be modulated to a position between the closed position and the opened position so that it is partially opened to admit a predetermined amount of selected exhaust gases through the recirculation conduit 102. The recirculation valve 106 may be modulated in any one of the heat recovery mode, the partial bypass acoustic mode, and/or the full bypass acoustic mode.

The present disclosure combines three separate devices (i.e. an EHRS, an acoustic control device, and an EGR) into one package for inclusion in the exhaust system of the vehicle. In some embodiments, the present disclosure allows for once heat exchanger and actuator to be eliminated simplify the wiring and reducing cost. The present disclosure also minimizes package space.

Although an embodiment of this invention has been disclosed, a worker of ordinary skill in this art would recognize that certain modifications would come within the scope of this invention. For that reason, the following claims should be studied to determine the true scope and content of this invention.

The following numbered clauses include embodiments that are contemplated and non-limiting:

Clause 1. A vehicle exhaust system comprising:
an exhaust pipe defining a primary exhaust flow path;
a heat recovery device connected to the exhaust pipe and defining a heat recovery flow path;
an exhaust gas recirculation unit coupled to the heat recovery device and configured to recirculate selected exhaust gas back to an engine intake for mixing with fresh air that enters the engine, the exhaust gas recirculation unit including a recirculation conduit defining a recirculation flow path and a recirculation valve that controls flow of the selected exhaust gas through the recirculation flow path, and
a diverter valve that controls exhaust gas flow between the exhaust pipe and heat recovery device, the diverter valve being moveable between at least a heat recovery mode where the diverter valve blocks flow through the exhaust pipe and directs flow into the heat recovery device, a full bypass acoustic mode where the diverter valve directs flow through the exhaust pipe, and a partial bypass acoustic mode where the diverter valve partially blocks flow through the exhaust pipe.

Clause 2. The vehicle exhaust system of clause 1 or any other suitable clause, wherein the recirculation valve is configured to move from a closed position when the diverter valve is in the heat recovery mode to an opened position when the diverter valve is in one of the full bypass acoustic mode and the partial bypass acoustic mode.

Clause 3. The vehicle exhaust system of clause 2 or any other suitable clause, wherein the diverter valve and the recirculation valve are coupled to a controller and each receive control signals from the controller that synchronize movement of the recirculation valve between the opened position and the closed position with movement of the diverter valve.

Clause 4. The vehicle exhaust system of clause 2 or any other suitable clause, wherein the exhaust gas recirculation unit is coupled to the heat recovery device downstream of a heat exchanger included in the heat recovery device and upstream of the diverter valve.

Clause 5. The vehicle exhaust system of clause 1 or any other suitable clause, wherein the heat recovery device has a device inlet in fluid communication with the exhaust pipe and a device outlet in fluid communication with the exhaust pipe, and an inlet to the recirculation conduit is positioned downstream of the device inlet and upstream of the device outlet.

Clause 6. The vehicle exhaust system of clause 5 or any other suitable clause, wherein the diverter valve is mounted at the device outlet.

Clause 7. The vehicle exhaust system of clause 1 or any other suitable clause, wherein the diverter valve comprises a valve body having a first opening, a second opening facing opposite the first opening, and a third opening positioned between the first and second openings, and wherein the valve body includes a curved portion facing an inner surface of the barrel housing.

Clause 8. The vehicle exhaust system of clause 7 or any other suitable clause, wherein, when in the heat recovery mode:
the curved portion blocks flow through the exhaust pipe,
the second opening is fluidly connected to the device outlet,
the recirculation valve is in a closed position; and
the third opening directs flow from the device outlet back into the exhaust pipe downstream of the heat recovery device.

Clause 9. The vehicle exhaust system of clause 7 or any other suitable clause, wherein, when in the full bypass acoustic mode:
the curved portion blocks flow from the device outlet,
the first opening receives flow from the exhaust pipe,
the second opening directs flow from the first opening into the exhaust pipe downstream of the heat recovery device, and
the recirculation valve is in an opened position.

Clause 10. The vehicle exhaust system of clause 7 or any other suitable clause, wherein, when in the partial bypass acoustic mode:
the curved portion blocks flow from the device outlet and partially blocks flow through the exhaust pipe,
the first opening receives flow from the exhaust pipe,
the third opening receives flow from the exhaust pipe,
the second opening directs flow from the first and third openings into the exhaust pipe downstream of the heat recovery device, and
the recirculation valve is in an opened position.

Clause 11. The vehicle exhaust system of clause 1 or any other suitable clause, wherein the diverter valve is movable to a transition mode where the diverter valve partially blocks flow through the heat recovery device and partially blocks flow through the exhaust pipe.

Clause 12. An over-the-road vehicle comprising
a combustion engine with an air-intake manifold, and
an exhaust system including
an exhaust pipe defining a primary exhaust flow path;

a heat recovery device connected to the exhaust pipe and defining a heat recovery flow path;
an exhaust gas recirculation unit coupled to the heat recovery device and configured to recirculate selected exhaust gas back to the air-intake manifold for mixing with fresh air that enters the engine, the exhaust gas recirculation unit including a recirculation conduit defining a recirculation flow path and a recirculation valve that controls flow of the selected exhaust gas through the recirculation flow path, and
a diverter valve that controls exhaust gas flow between the exhaust pipe and heat recovery device, the diverter valve being moveable between at least a heat recovery mode where the diverter valve blocks flow through the exhaust pipe and directs flow into the heat recovery device, a full bypass acoustic mode where the diverter valve directs flow through the exhaust pipe, and a partial bypass acoustic mode where the diverter valve partially blocks flow through the exhaust pipe.

The invention claimed is:

1. A vehicle exhaust system comprising:
an exhaust pipe defining a primary exhaust flow path;
a heat recovery device connected to the exhaust pipe and defining a heat recovery flow path;
an exhaust gas recirculation unit coupled to the heat recovery device and configured to recirculate selected exhaust gas back to an engine intake for mixing with fresh air that enters the engine, the exhaust gas recirculation unit including a recirculation conduit defining a recirculation flow path and a recirculation valve that controls flow of the selected exhaust gas through the recirculation flow path, and
a diverter valve that controls exhaust gas flow between the exhaust pipe and heat recovery device, the diverter valve being moveable between at least a heat recovery mode where the diverter valve blocks flow through the exhaust pipe and directs flow into the heat recovery device, a full bypass acoustic mode where the diverter valve directs flow through the exhaust pipe, and a partial bypass acoustic mode where the diverter valve partially blocks flow through the exhaust pipe.

2. The vehicle exhaust system of claim 1, wherein the recirculation valve is configured to move from a closed position when the diverter valve is in the heat recovery mode to an opened position when the diverter valve is in one of the full bypass acoustic mode and the partial bypass acoustic mode.

3. The vehicle exhaust system of claim 2, wherein the diverter valve and the recirculation valve are coupled to a controller and each receive control signals from the controller that synchronize movement of the recirculation valve between the opened position and the closed position with movement of the diverter valve.

4. The vehicle exhaust system of claim 2, wherein the exhaust gas recirculation unit is coupled to the heat recovery device downstream of a heat exchanger included in the heat recovery device and upstream of the diverter valve.

5. The vehicle exhaust component of claim 1, wherein the heat recovery device has a device inlet in fluid communication with the exhaust pipe and a device outlet in fluid communication with the exhaust pipe, and an inlet to the recirculation conduit is positioned downstream of the device inlet and upstream of the device outlet.

6. The vehicle exhaust component of claim 5, wherein the diverter valve is mounted at the device outlet.

7. The vehicle exhaust component of claim 1, wherein the diverter valve comprises a valve body having a first opening, a second opening facing opposite the first opening, and a third opening positioned between the first and second openings, and wherein the valve body includes a curved portion facing an inner surface of the barrel housing.

8. The vehicle exhaust system of claim 7, wherein, when in the heat recovery mode:
the curved portion blocks flow through the exhaust pipe,
the second opening is fluidly connected to the device outlet,
the recirculation valve is in a closed position; and
the third opening directs flow from the device outlet back into the exhaust pipe downstream of the heat recovery device.

9. The vehicle exhaust system of claim 7, wherein, when in the full bypass acoustic mode:
the curved portion blocks flow from the device outlet,
the first opening receives flow from the exhaust pipe,
the second opening directs flow from the first opening into the exhaust pipe downstream of the heat recovery device, and
the recirculation valve is in an opened position.

10. The vehicle exhaust system of claim 7, wherein, when in the partial bypass acoustic mode:
the curved portion blocks flow from the device outlet and partially blocks flow through the exhaust pipe,
the first opening receives flow from the exhaust pipe,
the third opening receives flow from the exhaust pipe,
the second opening directs flow from the first and third openings into the exhaust pipe downstream of the heat recovery device, and
the recirculation valve is in an opened position.

11. The vehicle exhaust system of claim 1, wherein the diverter valve is movable to a transition mode where the diverter valve partially blocks flow through the heat recovery device and partially blocks flow through the exhaust pipe.

12. An over-the-road vehicle comprising
a combustion engine with an air-intake manifold, and
an exhaust system including
an exhaust pipe defining a primary exhaust flow path;
a heat recovery device connected to the exhaust pipe and defining a heat recovery flow path;
an exhaust gas recirculation unit coupled to the heat recovery device and configured to recirculate selected exhaust gas back to the air-intake manifold for mixing with fresh air that enters the engine, the exhaust gas recirculation unit including a recirculation conduit defining a recirculation flow path and a recirculation valve that controls flow of the selected exhaust gas through the recirculation flow path, and
a diverter valve that controls exhaust gas flow between the exhaust pipe and heat recovery device, the diverter valve being moveable between at least a heat recovery mode where the diverter valve blocks flow through the exhaust pipe and directs flow into the heat recovery device, a full bypass acoustic mode where the diverter valve directs flow through the exhaust pipe, and a partial bypass acoustic mode where the diverter valve partially blocks flow through the exhaust pipe.

* * * * *